May 11, 1954  A. A. DE KONING ET AL  2,678,114

SHOCK ABSORBER WITH ADJUSTABLE VALVE

Filed Nov. 5, 1949

INVENTORS:
A.A. de KONING and K.K.K. de KONING
BY
A. John Michel
ATTORNEY

Patented May 11, 1954

2,678,114

UNITED STATES PATENT OFFICE 2,678,114

SHOCK ABSORBER WITH ADJUSTABLE VALVE

Arie Adrianus de Koning and Kornelis Korstiaan Karel de Koning, Oud-Beijerland, Netherlands Application November 5, 1949, Serial No. 125,822

Claims priority, application Netherlands November 10, 1948

4 Claims. (Cl. 188—88)

The present invention relates to a hydraulic shock absorber and more particularly to a cylindrical shock absorber wherein a reciprocable piston structure divides the cylinder into two chambers and a fluid intercommunication system is provided between the cylinder chambers.

It is a principal object of the present invention to provide a hydraulic shock absorber of the above type with valve means in the intercommunication system which can be accurately controlled and adjusted from the outside without dismantling the shock absorber.

In accordance with this invention, the valve means controlling the flow of shock absorbing medium from one cylinder chamber to the other comprises an axially movable sleeve over the inner end of the piston rod, radial passage means in the piston rod forming part of the intercommunication between the two chambers and being arranged within the range of the axial movement of the sleeve, and means at the inside of the cylinder for engaging the sleeve, when desired, whereby the sleeve may be moved axially over said radial passage means by rotating the piston relative to the cylinder.

The various features and advantages of this invention will be more clearly understood in conjunction with the following detailed description of the drawing showing a preferred embodiment thereof which is given by way of example and which in no way limits the scope of the invention as defined in the claims. In the drawing, Fig. 1 shows a side view, partly in section, of the shock absorber;

Figure 1:
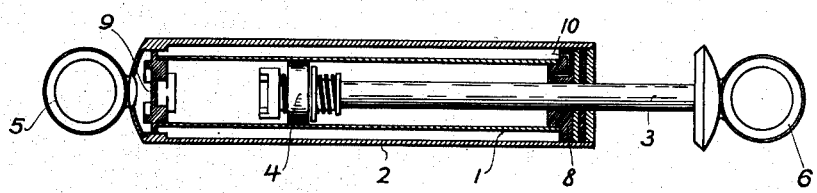
Figure 2:
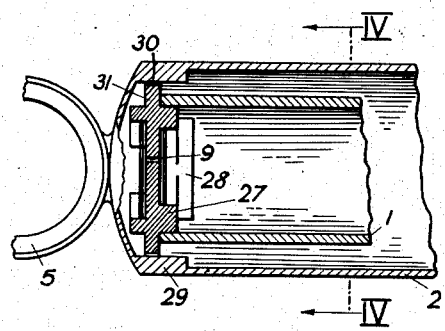
Fig. 2 represents a longitudinal section of an end portion of the shock absorber, on an increased scale.

Referring now to the drawing, there is shown a cylinder 1 mounted in an outer housing 2. A piston structure comprising piston rod 3 and piston body 4 is axially movably arranged in cylinder 1. Outer housing 2 has lug or eyelet 5 attached at one end thereof, while lug or eyelet 6 is attached to the outer end of piston rod 3. Lugs 5 and 6 are connected to any parts which are movable in relation to each other and whose shocks the shock absorber is designed to absorb in a generally well known manner.

Piston rod 3 is tightly mounted in a central aperture in the bottom closure 8, this mounting being effected in a manner known per se to prevent seepage of shock absorbing medium from the interior. Cylinder 1 communicates with outer housing 2 by means of apertures 9 and 10.

Figure 3:
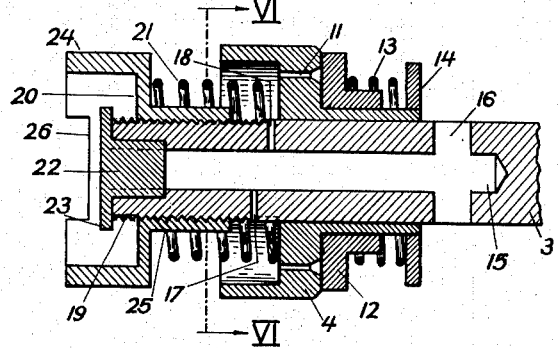
Fig. 3 is a longitudinal section showing the piston structure and valve means of the shock absorber, also on an increased scale.
Figure 5:
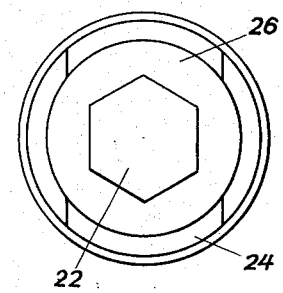
Fig. 5 is a top view of the piston structure seen from the left of Fig. 3.
Figure 6:
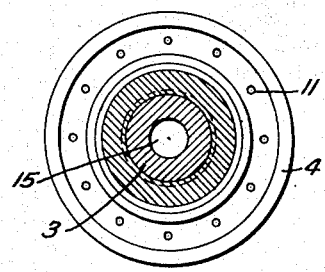
Fig. 6 is a cross section along line VI—VI of Fig. 3.

The outer wall of piston body 4 is in close engagement with the inner wall of cylinder 1, thereby dividing the cylinder into two chambers. As shown in Fig. 3, piston body 4 is provided with longitudinal bores 11 which can be closed at the side of piston rod 3 by means of ring 12. The ring is pressed against the bores 11 by coil spring 13 mounted concentrically on the piston rod between ring 12 and fixed collar 14. In this manner, shock absorbing medium can pass through bores 12 only in the direction of the chamber holding the piston rod and only if the pressure of the shock absorbing medium in the other chamber is stronger than the pressure of spring 13 and stronger than the pressure of the shock absorbing medium in the chamber holding the piston rod. Otherwise, ring 12 will be pressed tightly against the bores and prevent any shock absorbing medium from passing either way.

Piston rod 3 is provided with central passage 15 which communicates with one chamber by means of aligned radial bores 16 and with the other chamber by means of longitudinally staggered radial bores 17 and 18 of considerably smaller diameter than that of bores 16, passages 16, 15, 17 and 18 providing an intercommunicating system between the two chambers of cylinder 1. The end of piston rod 3 is provided with a threaded portion 19 which rotatably carries member 20 consisting of cup-shaped head 24 and internally threaded sleeve 25. As will be seen, sleeve 25 will cover first bore 17 and then bore 18 when member 20 is rotated toward piston body 4. Coil spring 21 prevents undesirable rotation of member 20 during operation.

Figure 4:
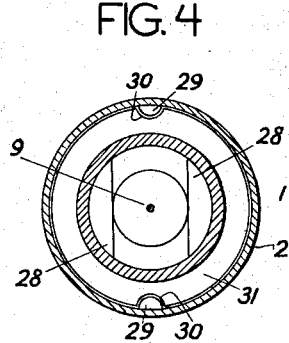
Fig. 4 is a cross section along line IV—IV of Fig. 2.

Cup-shaped head 24 of member 20 is provided with recesses 26 and bottom 27 of cylinder 1 carries projections 28 designed to cooperate with and engage recesses 26. Bottom 27 is provided with a flange 31 having recesses 30 and outer housing 2 is provided with shoulders 29 fitting into recesses 30 (see Fig. 4). Cooperation of shoulders 29 with recesses 30 assures that, while cylinder 1 may be moved longitudinally in respect to outer housing 2, it cannot rotate in relation thereto.

As will appear from Fig. 1, recesses 26 of cup-shaped head 24 of member 20 may be brought into engagement with projections 28 of cylinder bottom 27 when piston rod 3 with piston body 4 is completely pushed into cylinder 1. If the outer housing 2 (with cylinder 1) is rotated in relation to piston 3, 4 by means of lug 5 or 6, member 20 will also be rotated since projections 27 engage recesses 26 and sleeve 25 will be axially moved upon the piston rod.

Threaded plug 22 is screwed into the open end of the central piston rod bore 15 so that this central bore may be cleaned merely by unscrewing this plug. Flange 23 of plug 22 prevents member 20 from being screwed off the piston rod.

The operation of the shock absorber is as follows:

The setting of sleeve 25 in relation to radial bores 17, 18 is adjustable from the outside by rotating housing 2 in relation to the piston structure while the piston rod is pushed in and projections 28 engage recesses 26 of cup-shaped portion 24. This setting is originally effected in accordance with predetermined standards and it remains unchanged during operation until and unless adjustment becomes necessary. In this case, it is not necessary to dismantle the shock absorber but merely to detach it from one or both parts with which it is connected by lugs 5 and 6, and to push the piston rod down into the cylinder whereby projections 28 are thrust into recesses 26. When member 20 is firmly engaged by projections 28 and thus held against rotation relative to cylinder 1 and housing 2, it can be reset in relation to axial bores 17 and 18 by rotating piston rod 3 by means of lug 6 whereby sleeve 25 is axially threaded toward or away from bores 17, 18. If member 20 is in the position shown in Fig. 3, there will be free passage of shock absorbing medium from one cylinder chamber to the other by way of communicating system 16, 15 and 17, 18. If it is desirable to change the amount of leakage from one chamber to the other, member 20 may be threaded over the piston rod sufficiently to cover passage 17, or part of it, and, finally, part or all of passage 18. Under heavy pressure, some shock absorbing medium will also flow through the normal clearance between thread 19 and sleeve 25.

The valve arrangement whose operation has been described hereinabove makes it possible to control the flow of shock absorbing medium between the cylinder chambers from the outside.

What we claim is:

1. In a hydraulic shock absorber comprising a cylinder, a reciprocable piston structure dividing said cylinder into two chambers, and a fluid intercommunication system between the two chambers, including a central bore and radial passage means in the piston: a sleeve having a cup-shaped head threadedly arranged on the inner end of the piston for axial movement thereon, at least one of said radial passage means being located within range of the axial movement of the sleeve and projecting means at the end of the cylinder and engaging said cup-shaped head when the same is brought into cooperation therewith, the cup-shaped head and sleeve being axially moved when the head is engaged by said projecting means and the piston is rotated relative to the cylinder.

2. In a hydraulic shock absorber as defined in claim 1: a spring mounted on the piston and arranged to press against said cup-shaped head.

3. In a hydraulic shock absorber comprising a cylinder, a reciprocable piston structure dividing said cylinder into two chambers, and a fluid inter-communication system between the two chambers, including a central bore and radial passages in the piston: a sleeve threadedly arranged on the inner end of the piston for axial movement thereon, a cup-shaped head mounted on the sleeve, said sleeve being arranged in one of said chambers, at least two of said radial passages being located in said one chamber in staggered relationship to each other within range of the axial movement of said sleeve, at least one of said radial passages being located in the other one of said chambers, the diameters of the first-named radial passages being very small compared to the diameter of the radial passages communicating with the other chamber, and projecting means at the end of the cylinder and engaging said cup-shaped head when the same is axially moved into cooperation therewith, the cup-shaped head and sleeve being axially moved when the head is engaged by said projecting means and the piston is rotated relative to the cylinder.

4. In a hydraulic shock absorber as defined in claim 3: a spring mounted on the piston and arranged to press against said cup-shaped head.

References Cited in the file of this patent

UNITED STATES PATENTS

| Number | Name | Date |
|---|---|---|
| 2,089,656 | Magrum | Aug. 10, 1937 |
| 2,117,837 | Casper | May 17, 1938 |
| 2,122,407 | Chisholm, Jr. | July 5, 1938 |
| 2,396,227 | Beecher | Mar. 12, 1946 |

FOREIGN PATENTS

| Number | Country | Date |
|---|---|---|
| 998,930 | France | Sept. 26, 1951 |
| 666,116 | Great Britain | Feb. 6, 1952 |
| 70,339 | Netherlands | July 17, 1952 |